3,220,916
DECORATIVE LAMINATE
John Christos Petropoulos, Norwalk, Conn., assignor, by mesne assignments, to Formica Corporation, Cincinnati, Ohio, a corporation of Delaware
No Drawing. Filed Aug. 13, 1963, Ser. No. 301,890
14 Claims. (Cl. 161—151)

This invention relates to novel, unitary, heat- and pressure-consolidated laminated articles and to methods of preparing such articles. More particularly, this invention relates to novel, unitary, heat- and pressure-consolidated, thermoset resin-bonded multilayer decorative laminates suitable for outdoor use comprising (1) a rigidity-imparting base member, (2) a print sheet member, directly bonded to said base member, comprising an acrylic fiber sheet containing fibrillated wet-spun polynitrile filaments impregnated or coated with a substantially completely cured resinous composition which, in its uncured state, is a curable resinous composition comprising (A) a reactive, water-insoluble, essentially linear thermoplastic vinyl copolymer prepared by emulsion or solution polymerization techniques and containing, either regularly or randomly dispersed along the polymer chains, pendant unreacted functional groups, e.g., carboxylic acid, amide, methylol amide or hydroxyl groups, and the like, in admixture with (B) a cross-linking agent which is either an alkyl ether of a polymethylolated melamine or a water-insoluble diepoxide from the class of 3,4-epoxycyclohexylmethyl, 3,4-epoxycyclohexanecarboxylates, said unreacted functional groups being reactive with the alkoxymethyl or epoxide groups in said cross-linking agent, as will be explained in greater detail hereinbelow, and said print sheet member having been treated with said curable resinous composition from organic solution, and (3) a clear, protective top film, overlaying said print sheet member and directly bonded thereto, comprising a thermoplastic resin or a thermoset resinous composition which is either unreinforced or reinforced with an acrylic fiber sheet, preferably undecorated, of the type used as the print sheet.

Conventional decorative laminates whose decorative effect results, at least in part, from a thermoset resin-impregnated cellulosic print sheet, which in turn is usually overlaid with and protected by a thermoset resin-impregnated undecorated cellulosic sheet, e.g., melamine-formaldehyde and polyester resin-impregnated cellulosic decorative laminates, deteriorate rapidly on exposure to outdoor conditions. It has long been the opinion of those skilled in the art that the cellulosic sheets are as much responsible for this deterioration as the weathering conditions to which the laminate is subjected. Cellulosic fibers have a marked tendency to absorb moisture. Thus, once the thermoset resin impregnant surrounding the cellulosic fibers has been cracked or crazed by stresses resulting from prolonged exposure to heat, sunlight and moisture, or worn away by wind-driven dust and other sources of abrasion normally encountered in outdoor use, and then penetrated by moisture coming from within the resin layer or generated outside of it, the fibrous structure of the overlay and print sheets, acting as a wick, draws in this moisture. This not only results in cloudiness and opacity within the laminate but also leads to further weakening of its structure.

The present invention provides a solution to this problem of deterioration on exposure to outdoor conditions inherent in the majority of the thermoset resin-impregnated cellulosic sheet-containing decorative laminates of the prior art. More particularly, the practice of the present invention provides novel heat- and pressure-consolidated thermoset resin-impregnated multilayer decorative laminates which can be satisfactorily employed for a plurality of outdoor uses, for example as building panels, siding and sheathing, message-bearing signs, and the like.

It is, therefore, an object of my invention to provide novel, unitary, heat- and pressure-consolidated, thermoset resin-bonded multilayer decorative laminates.

It is also an object of my invention to provide novel, unitary, heat- and pressure-consolidated, thermoset resin-bonded multilayer decorative laminates suitable for outdoor use wherein the decorative laminates suitable for outdoor use wherein the decorative effect is provided by a print sheet member comprising an acrylic fiber sheet containing fibrillated wet-spun filaments of a polymer of acrylonitrile, impregnated or coated with the thermoset resinous reaction product of a reactive (cross-linkable), water-insoluble, essentially linear thermoplastic vinyl copolymer and etither a highly alkoxy-methylated melamine or a 3,4-epoxycyclohexylmethyl, 3,4-epoxycyclohexanecarboxylate, said print sheet member being overlaid with a clear, protective top film comprising a thermoplastic resin or a thermoset resinous composition, either of which can be unreinforced or reinforced with an additional acrylic fiber sheet.

A further object of my invention is to provide novel, unitary, heat-, and pressure-consolidated, thermoset resin-bonded multilayer decorative laminates suitable for outdoor use which are characterized by excellent heat-, solvent- and abrasion-resistance, dimensional stability and resistance to crazing, as well as by excellent decorative effect.

These and other objects of my invention will be discussed more fully hereinbelow.

Any of a plurality of conventional materials can be employed as the base or core member in my novel laminates. This is due primarily to the fact that the base member cannot be seen when the laminate is in use, and also because this part of the laminate is not subjected to the same degree of wear as the decorative surface. The base member functions to impart rigidity to the laminate, and comprises a solid substrate which may or may not be formed prior to the initial laminating step, e.g., a plurality of sheets of kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a mineral base board, such as an epoxy-polyamine resin-treated cement-asbestos board, sheet rock, plaster board and the like, or a combination of these substrates, e.g., a combination of a plurality of phenolic resin-impregnated kraft paper sheets over a piece of cement-asbestos board, particle board, or the like.

One highly suitable class of base members comprises the aforementioned phenolic resin-impregnated paper base members. Such base members are preferably united with the print sheet member and the clear, protective top film by employing, as the bottommost member of an individual laminating assembly, one or more sheets or plies of a low-cost kraft paper, creped kraft paper, or both, which have been impregnated with the least amount of a thermosetting phenolic resin capable of providing a good bond in the core assembly, e.g., amounts of phenolic resin ranging from about 25% to about 40% by weight, based on the total dry weight of the impregnated paper. The print sheet member and the clear, protective top film (or precursor thereof) are then placed over this core assembly, and the entire laminating assembly is then consolidated, by means of heat and pressure, in one pressing operation.

Ordinarily, from about 5 to about 8 sheets of phenolic resin-impregnated paper will be used, thereby providing a base member which, in the finished laminate, will usually be at least about one sixteenth of an inch thick. It should be noted, however, that laminates of this type wherein the thickness of the entire assembly of the top film, print sheet and base members is as little as about one thirty-second of an inch or less, as obtained, for example, by using fewer phenolic resin-impregnated sheets in the base member, can be prepared and are suitable for many uses. Thus, neither the number of sheets of paper, the amount of phenolic resin, nor the thickness ultimately achieved in a base member of this type is critical. However, it has been found that a thickness of at least one sixteenth of an inch is especially desirable when the laminate is consolidated, either during the initial laminating step by means of heat and pressure or afterwards by adhesive bonding, with an additional solid or precured substrate of the type mentioned hereinabove, e.g., a piece of asbestos-cement board, particle board, or the like, in that phenolic resin-impregnated paper base members having at least this minimum thickness are better able to relieve or take up stresses produced by these additional substrates, certain of which are relatively dimensionally unstable, thereby preventing cracking or crazing on the decorative surface of the laminate. It has also been found that even where no phenolic resin-impregnated paper base member is used, the thickness of the solid substate used in its place should be at least about one sixteenth of an inch for the same reason, with the thickness of any particular solid substrate chosen being correlated with its density whereby said substrate is adapted to retain its form under moderate stress. The maximum thickness of any of the base members in question is governed by practical considerations, e.g., cost, availability, where and how the finished laminate is to be used, and so forth.

The thermosetting phenolic resins used to impregnate a base or core member comprising one or more sheets of kraft or creped kraft paper as well known in the art as shown, for example, in U.S. Patent Nos. 2,205,427; 2,315,087 and 2,328,592, among others which are incorporated herein by reference. These resins are conventionally obtained by reacting a phenolic substance such as phenol itself, substituted phenols, e.g., alkyl phenols such as cresols, xylenols, tertiary alkyl phenols, and the like, or mixtures of such phenolic substances, with an aldehyde such as formaldehyde, acetaldehyde, propionaldehyde, benzaldehyde, furfural, and the like, or with mixtures of such aldehydes, either alone or in the presence of other aldehyde-reactable substances such as urea, thiourea, substituted ureas and thioureas, amino-triazines, e.g., melamine, lignin derivatives, and the like.

Further details relating to base or core members which can be used in practicing the present invention may be found in U.S. Patent No. 3,021,239 to Lindenfelser et al., which is also incorporated herein by reference.

The acrylic fiber sheets employed as the print sheet and, if desired, as part of the overlay member in my novel laminates are known in the paper-making art. In general, these sheets are prepared by first forming an essentially linear homopolymer of an $\alpha,\beta$-ethylenically unsaturated nitrile, such as acrylonitrile, or an essentially linear coplymer of said nitrile with up to about 15% by weight, eg., from about 1% to about 15% by weight, based on the total weight of polymerizable monomers present, of one or more different $\alpha,\beta$-ethylenically unsaturated comonomers having a

group, e.g., methyl acrylate, methyl methacrylate, and the like, preferably in aqueous emulsion in the presence of ammonium persulfate as catalyst. The polymer of copolymer is then dissolved in a suitable solvent, e.g., aqueous sodium thiocyanate, to give a gel which, when wet-spun i.e., extruded into water, forms threads or filaments. Next, these wet-spun filaments are stretched, in five increments, to 15 times their initial length, which new length constitutes approximately 90% of the elongation at breakage. Detailed methods for the preparation of these filaments are given in numerous U.S. patents, including Nos. 2,558,735 and 2,633,803 to Cresswell; 2,595,847 to Hoxie; 2,611,929 to Ham and 2,613,195 to Craig, each of which is incorporated herein by reference. The wet-spun filaments, in a wet gel state, are then refined, e.g., by beating them in aqueous suspension, until they have fibrillated. Next, the fibrillated filaments, alone or in admixture with minor amounts of other felting fibers, such as cellulose, glass, asbestos, or silk fibers and the like, are sheeted to form a water-laid web. Finally, this water-laid web is heated, e.g., to a temperature of from about 150° F. to about 250° F., to dry the web and develop therein the latent bonding properties imparted to the polynitrile filaments by fibrillation. Further details regarding the preparation of these acrylic fiber sheets are given in U.S. Patent Nos. 2,810,646 and 3,047,455 which are also incorporated herein by reference.

I prefer to employ acrylic fiber sheets of from about 1 to about 27 mils in thickness, ranging in basis weight grade from about 10 to about 250 pounds, in which the fibrillated wet-spun polynitrile filaments comprise copolymers of acrylonitrile with up to about 10% by weight, e.g., from about 1% to about 10% by weight, of either methyl acrylate or methyl methacrylate. Particularly in the case of the print sheet member, the acrylic fiber sheet can be printed with ornamental designs or it can be dyed or pigmented to impart solid colors thereto, although an acrylic fiber sheet comprising part of the overlay member can also be decorated in any manner so long as this decoration does not completely obscure the print sheet member. Printed designs having an unlimited range or form of artistic effect may be employed, so long as the inks or other coloring matter contained therein are non-bleeding in the curable resinous composition with which the sheet is subsequently saturated. Parenthetically, it should be noted that these inks or colorants will preferably be resistant to fading under outdoor conditions. In addition, the polynitrile filaments making up the acrylic fiber sheets may contain minor amounts of such materials as are normally present in textile fibers, e.g., delusterants, antistatic agents, and the like, while the acrylic fiber sheets themselves may also contain, in addition to the polynitrile and other fibers previously referred to, minor amounts of any of the softening agents, sizes, coating materials and the like commonly employed in the manufacture of paper.

Where an acrylic fiber sheet is employed as part of the overlay member, its refractive index preferably matches that of the thermoplastic resin or thermoset resinous composition integral therewith. A preferred acrylic fiber sheet for this purpose is one made up of fibrillated wet-spun filaments of a copolymer of 90 parts of acrylonitrile and 10 parts methyl methacrylate. However, the formulation of other acrylic fiber sheets by proper choice of comonomers and no portions of comonomers such that their refractive indices will match those of the resinous materials which they reinforce, is well within the skill of the art, and need not be considered here in any greater detail.

The thermosetting (curable) resinous compositions used to impregnate or coat the print sheet member in my novel laminates comprise, as indicated above, mixtures of two essential components. The first of these is a reactive, water-insoluble, essentially linear thermoplastic vinyl copolymer prepared from about 50% to about 98% by weight, and preferably from about 65% to about 90% by weight, based on the total weight of monomers in the copolymer, of (a) a monoethylenically unsaturated hardening comonomer, i.e., one whose glass transition temperature [$T_g$, as measured by plotting the specific volume of homopolymers prepared therefrom against temperature; see Tobolsky, "Properties and Structure of Polymers" (New York, John Wiley & Sons, Inc., 1960) at pages 61 to 71, inclusive], is above about 30–35° C., and which tends to form hard, relatively inflexible polymers, said hardening comonomer containing no functional groups which are reactive with an N-hydroxymethyl or -alkoxymethyl group or an epoxy group, and from about 2% to about 20% by weight, and preferably from about 5% to about 10% by weight, based on the total weight of monomers in the copolymer, of (b) a monoethylenically unsaturated comonomer containing a functional group which is reactive with an N-hydroxymethyl or -alkoxymethyl group or an epoxy group, e.g., a carboxylic acid, amide, methylol amide or hydroxyl group.

The preferred comonomer (a) is methyl methacrylate. However, other lower alkyl methacrylates wherein the lower alkyl group contains from 1 to 4 carbon atoms, e.g., ethyl methacrylate, propyl methacrylate, n-butyl methacrylate, isobutyl methacrylate, and the like, as well as mixtures thereof, can be employed in addition to or instead of methyl methacrylate. Furthermore, the lower alkyl methacrylate or methacrylates present can be replaced in whole or in part with one or more different hardening comonomers, such as styrene, alkyl styrenes such as p-methyl styrene and the like, halostyrenes such as chlorostyrene and the like, acrylonitrile, methacrylonitrile, t-amyl methacrylate, t-butyl acrylate, t-amyl acrylate, benzyl methacrylate, vinyl chloride, and the like.

Comonomer (b) is preferably an acrylic (including alkacrylic, haloacrylic, and the like) acid, an acrylic acid amide, a hydroxylated alkyl ester of an acrylic acid, or a mixture of such monomers, and in addition is preferably a hardening comonomer. Included among these reactive group-containing monomers are acrylic acid, methacrylic acid, ethacrylic acid, $\alpha$-chloroacrylic acid, and the like; the corresponding amides and methylol amides, e.g., acrylamide, methacrylamide, methylol acrylamide, methylol methacrylamide, and the like, and hydroxylated alkyl esters of acrylic and methacrylic acid such as $\beta$-hydroxyethyl acrylate, $\beta$-hydroxyethyl methacrylate, $\beta$-hydroxyethyl $\alpha'$-chloroacrylate, $\gamma$-hydroxypropyl acrylate, $\delta$-hydroxybutyl methacrylate, and the like. In addition, $\alpha,\beta$-unsaturated guanamines, such as methacryloguanamine, N-phenylmethacryloguanamine, and the like, can also be employed as reactive group-containing monomers.

Where a 3,4-epoxycyclohexylmethyl 3,4-epoxycyclohexanecarboxylate is used as the cross-linking agent, the choice of a comonomer (b) will be limited to the acrylic acids in order to provide a copolymer having sufficient reactivity to effectively combine with the diepoxide under the conditions of temperature and pressure employed in preparing the laminates of the present invention. However, where a highly alkoxymethylated melamine is used as the cross-linking agent, any of the aforementioned comonomers (b) can be used.

If desired, the reactive copolymer may also include (c) a monoethylenically unsaturated softening comonomer, i.e., one whose glass transition temperature is below about 15–20° C. and which tends to form soft, relatively flexible polymers, said softening comonomer containing no functional groups which are reactive with an N-hydroxymethyl or -alkoxymethyl group or an epoxy group. These softening monomers preferably comprise an alkyl acrylate wherein the alkyl group contains from 1 to about 12 carbon atoms, such as methyl acrylate, ethyl acrylate, propyl acrylate, n-butyl acrylate, 2-ethylhexyl acrylate, octyl acrylate, dodecyl acrylate, and the like, as well as mixtures thereof, and can be present in the copolymer in amounts ranging from 5% to about 45% by weight, and preferably from about 5% to about 20% by weight, based on the total weight of monomers in the copolymer, depending on the properties or combinations of properties, e.g., hardness coupled with flexibility, desired in the final product. Comonomer (c), if employed, will generally replace part of comonomer (a), but in any event, the copolymer will contain not less than about 50% by weight, based on the total weight of monomers in the copolymer, of hardening monomer(s). Furthermore, in every case the total amount of comonomers (a) and (b) or (a), (b) and (c) employed, will equal 100%.

Suitable emulsion and solution polymerization techniques for the preparation of reactive copolymers of the type employed in practicing the present invention from monomers such as those listed hereinabove are so numerous and so well known in the art that only the most cursory treatment of such techniques is necessary here.

In general, where an emulsion system is used, the selected comonomers are emulsified in water, using from about 1% to about 10% by weight, based on the total weight of monomers present, of a conventional emulsifying agent. This emulsifying agent can be non-ionic, e.g., an alkylphenoxypolyethoxyethanol having alkyl groups of from about 7 to about 18 carbon atoms in length and from about 6 to about 60 oxyethylene units, such as the heptylphenoxypolyethoxyethanols, methyloctylphenoxypolyethoxyethanols, dodecylphenoxypolyethoxyethanols, and the like; a long chain fatty acid derivative of sorbitol, such as sorbitan monolaurate, monopalmitate, monostearate, tristearate, and the like; an ethylene oxide derivative of an etherified or esterified polyhydroxy compound having a hydrophobic carbon chain, such as a polyoxyethylene sorbitan monolaurate, monopalmitate, monostearate, and the like, anionic, e.g., sodium lauryl sulfonate, sodium isopropylnaphthalene sulfonate, di-2-ethylhexyl sodium sulfosuccinate, and the like, or cationic, e.g., stearamidopropyldimethyl-2-hydroxyethylammonium phosphate and the corresponding nitrate, stearyldimethylbenzylammonium chloride, and the like, as well as mixtures thereof.

The emulsified comonomers are copolymerized by means of a catalytic amount of a conventional free radical polymerization catalyst or catalyst system, e.g., an inorganic or organic peroxide such as hydrogen peroxide, t-butyl hydroperoxide, cumene hydroperoxide, and the like, an azo nitrile, such as $\alpha,\alpha'$-azobisisobutyronitrile and the like, an inorganic persulfate, such as ammonium persulfate, sodium persulfate, potassium persulfate, and the like, or a redox catalyst system, such as sodium metabisulfite-potassium persulfate and the like. The particular catalyst or catalyst system chosen can generally be used in amounts ranging from about 0.01% to about 3% by weight, based on the total weight of comonomers present. The polymerization reaction can be carried out at a temperature ranging from about 0° C. to about 100° C., preferably at from about room temperature (25° C.) to about 70° C., and the emulsion will preferably be agitated during the reaction.

Solution polymerization of the selected comonomers is accomplished by dissolving them, together with a catalytic amount of a conventional free radical polymerization catalyst, e.g., one of the aforementioned organic peroxides, in a suitable inert organic solvent, such as acetone, methylethyl ketone, methyl isobutyl ketone, benzene, toluene, xylene, xylene-isobutanol mixtures, and the like, and heating the resulting solution at a temperature of from about 60° C. to about 190° C. until the desired degree of polymerization has taken place.

If the solvent in which the polymerization reaction is carried out is one which can also be used to dissolve the reactive copolymer and cross-linking agent when impregnating the acrylic fiber print sheet, the resulting copolymer solution, after the addition of the cross-linking agent, can be used directly to impregnate the print sheet. Alternatively, the copolymer can be separated from the solution in which it was prepared and then redissolved in the same or a different organic solvent when impregnating the print sheet.

The copolymers obtained by the above-described emulsion polymerization technique can have molecular weights ranging from about 25,000 to about 1,000,000 or higher, as determined by intrinsic viscosity measuremens [see Flory, "Principles of Polymer Chemistry" (Ithaca, N.Y., Cornell University Press, 1953), pages 308 to 311], while the corresponding solution copolymers will generally have molecular weights ranging from about 10,000 to about 1,000,000, as also determined by intrinsic viscosity measurements. The copolymers having molecular weights ranging from about 10,000 to about 100,000 are especially preferred for impregnating while those having molecular weights ranging from about 25,000 to about 1,000,000 are preferred for use in providing the clear, protective top film, as will be described in greater detail hereinbelow.

The second essential component of the curable resinous composition is a cross-linking agent selected from one of two distinct classes of compounds. The first of these classes encompasses the alkyl ether of polymethylolated melamines represented by the general formula:

wherein M represents melamine, the starting material, $F_x$ represents the degree to which the melamine starting material has been methylolated, with $x$ representing a number between about 5 and 6, inclusive, and $A_y$ represents the degree to which the methylol groups of the polymethylolmelamine intermediate have been alkylated with lower alkyl groups containing from 1 to 3 carbon atoms, inclusive, i.e., methyl, ethyl and propyl groups, to provide alkoxy-methyl groups containing from 2 to 4 carbon atoms, inclusive, in the highly alkoxymethylated melamine final product, with $y$ representing a number between 5 and 6, inclusive. Thus, the highly alkoxymethylated melamines employed in the practice of the present invention include the hexa-alkyl ethers of hexamethylolmelamine, such as hexakis(methoxymethyl)melamine and the like, which represent the highest degree of methylolation and alkylation obtainable, the penta-alkyl ethers of hexamethylolmelamine, such as the pentamethyl ether of hexamethylolmelamine, and the like, and the penta-alkyl ethers of pentamethylolmelamine, such as the pentamethyl ether of pentamethylolmelamine and the like. Furthermore, as is evident from the general formula and the values of $x$ and $y$ given above, one can use mixtures of these highly alkoxymethylated melamines, e.g., a mixture of hexakis(methoxymethyl)melamine and the pentamethyl ether of hexamethylolmelamine, as well as mixtures containing minor amounts of alkoxymethylated melamines having a slightly lower degree of methylolation or alkylation. In such cases $x$ and $y$ represent average values for the degree of methylolation and alkylation. Hexakis(methoxymethyl)melamine or mixtures containing a major amount thereof together with minor amounts of other highly methoxymethylated melamines having slightly lower degrees of methylolation and methylation are preferred for use in practicing the present invention.

Highly alkoxymethylated melamines are prepared by methods which are so well known in the art that it is not necessary that they be set forth herein in any great detail. In general, these conventional methods involve the basic steps of reacting melamine with aqueous formaldehyde in mol ratios ranging from about 6.5 to about 20 mols or more of formaldehyde per mol of melamine to form polymethylolmelamines; removing the bulk of the water from the thus-formed polymethylolmelamines, and thereafter reacting the polymethylolmelamines, under acidic conditions, with from about 10 to about 20 mols of a lower alkanol, such as methanol, ethanol, propanol, and the like, per mol of melamine starting material. Various modifications and improvements of this basic process have been developed, such as those set forth in U.S. Patent Nos. 2,715,619 to Suen et al. and 2,918,452 to Kun et al.

The second class of cross-linking agents which can be used in combination with the above-described reactive copolymers encompasses 3,4-epoxycyclohexylmethyl 3,4,-epoxycyclohexanecarboxylates, as exemplified particularly by 3,4-epoxy-6-methyl-cyclohexylmethyl 3,4-epoxy-6-methylcyclohexanecarboxylate. These 3,4-epoxycyclohexyylmethyl 3,4-epoxycyclohexanecarboxylates as well as methods of preparation are disclosed, for example, in U.S. Patent Nos. 2,716,123 and 2,890,209.

The solution used to impregnate the acrylic fiber print sheet is prepared by dissolving the reactive copolymer and the cross-linking agent in a readily volatile inert organic solvent, e.g., one having a boiling point, at atmospheric pressure, between about 60° C. and 190° C., preferably between about 90° C. and 120° C., such as acetone, methyl ethyl ketone, diethyl ketone, benzene, toluene, xylene, ethyl acetate, butyl acetate, methyl Cellosolve methylene chloride, dioxane, and the like, or a mixture of two or more of such solvents. The weight ratio of reactive copolymer:cross-linking agent (either highly alkoxymethylated melamine or diepoxide) in solution can range from about 95:5 to about 35:65, respectively, and preferably from about 90:10 to about 65:35, respectively, while the total amount of reactive copolymer plus cross-linking agent present in the impregnating solution can range from about 15% to about 60% by weight, and preferably from about 25% to about 50% by weight, based on the total weight of said solution.

When the reactive copolymer is prepared by the emulsion polymerization technique, the emulsion or dispersion containing the copolymer is first coagulated, e.g., by the addition of acetone, and the copolymer is then separated from the coagulum and dissolved in the inert organic solvent.

Any conventional method, e.g., dip-, brush-, flow-, roller- or spray-coating, can be used in impregnating or coating the acrylic fiber print sheet with the solution of the curable resinous composition comprising the reactive copolymer and the cross-linking agent. The print sheet will be impregnated with from about 35% to about 65% by weight, and preferably from about 40% to about 50% by weight, based on the total dry weight of the impregnated sheet, of the curable resinous composition. The desired degree of impregnation can be achieved by one or several treating passes and, as can be readily appreciated, where several passes are made, the solids content of the impregnating solution can be low, while for one-pass operations, higher solids contents will be required.

Following impregnation, the acrylic fiber print sheet will be dried at a temperature high enough so that substantially all of the inert organic solvent will be driven off and yet low enough so that the curable resinous impregnant will not be so substantially advanced in cure that it will not exhibit satisfactory flow under the relatively high pressures encountered in the subsequent laminating step, and thus will flow sufficiently to eliminate small pits, dents and other minor imperfections in the resinous layer. However, a certain amount of advancement, i.e., cross-linking between the reactive copolymer and the cross-linking agent, is desirable prior to the time at which the entire laminating assembly is consolidated in a laminating press, inasmuch as this insures that the curable resinous composition will not be squeezed out of the acrylic fiber print sheet in the press before being substantially completely cured. Furthermore, since cross-linking takes place fairly rapidly at temperatures above about 100° C., it is evident that any desired degree of advancement in cross-linking can be accomplished either during the drying step, if drying is carried out at sufficiently elevated temperatures, or subsequent to the time at which the overlay sheet can be considered substantially dry, by an additional heating period at temperatures substantially above room temperature, if drying is carried out at relatively lower temperatures, e.g., room temperature.

I prefer to employ a two-stage method of drying and partially advancing the curable resinous composition on the print sheet. The first, or drying stage, involves drying the treated sheet at a temperature ranging from about room temperature, i.e., about 25° C., to not more than about 150° C. for from about 30 seconds at the upper temperatures in this range to several hours, e.g., four hours or more, at the lower end of the range, depending, of course, on the solvent employed as well as the drying temperature. Preferably, drying will be accomplished by subjecting the impregnated sheet to a temperature of from about 80° C. to about 130° C. for from about 3 minutes to about 10 minutes. The second stage, during which the curable resinous composition on the substantially dry print sheet is partially advanced in cure, will be carried out at a temperature of from about 110° C. to about 150° C. for from about 2 minutes to about 10 minutes.

As previously indicated, drying and partial advancement of the curable resinous composition used to treat the print sheet can also be carried out in one step rather than in separate stages. However, care must be taken to avoid heating the impregnated sheet to the point at which the inert organic solvent being given off causes bubbling, since this can cause discontinuity, which in turn leads to poor bonding, particularly if, at the same time, the curable resinous composition is advanced to the point at which its flow under the relatively high pressures applied in the subseqeunt laminating step will be substantially diminished. Thus, one step drying (coupled with partial advancement) will preferably be carried out at a temperature ranging from about 80° C. to about 150° C. for from about 5 minutes to about 20 minutes.

An unreinforced, clear, protective top film overlay directly bonded to the impregnated acrylic fiber print sheet in my novel laminates can be derived from either of two distinct classes of materials. The first of these classes encompasses thermoset resin films obtained by (1) applying to the impregnated print sheet an aqueous emulsion or dispersion of a reactive copolymer of the type used in impregnating said print sheet, i.e., one of the above-described reactive, water-insoluble, essentially linear thermoplastic vinyl copolymers having a molecular weight of from about 25,000 to about 1,000,000, as determined by intrinsic viscosity measurements, in the aqueous emulsion or dispersion in which it was prepared, having a solids content, in the range of about 35–65% by weight, based on the total weight of the solution, sufficient to impart a treating viscosity of about 1000 to 1200 centipoises, in admixture with one of the aforementioned cross-linking agents, i.e., a highly alkoxymethylated melamine or a diepoxide from the class of 3,4-epoxycyclohexylmethyl 3,4-epoxycyclohexanecarboxylates, (2) drying this aqueous emulsion or dispersion or organic solution, and (3) curing the dried, curable film under laminating conditions.

The weight ratio of reactive copolymer:cross-linking agent and the total amount of these reactants present in the aqueous emulsion or dispersion or organic solution will be within the ranges set forth above for these reactants when used in solution to impregnate the print sheet. The surface of the impregnated print sheet opposite the side which will be in contact with the base member will be coated by any conventional method, e.g., brush-, spray-, or roller-coating, to give a coating which will ultimately result in a clear top film having a thickness of from about 0.5 mil to about 7 mils, and preferably from about 2 mils to about 4 mils. However, this coating step will be unnecessary if the fibrillated acrylic sheet has already been impregnated to an extent sufficient to provide a protective layer on the sheet of at least about 0.5 mil thickness. Finally, the coated, impregnated print sheet will be dried and the curable resinous composition coated thereon will be partially advanced in cure under the same conditions as those described above in connection with the impregnated print sheet, with care being taken to insure that the total amount of heat applied to the coated, impregnated print sheet will be insufficient to substantially advance the cure of either the resinous impregnant of the print sheet or the resinous coating thereon.

The second class of materials used to provide an unreinforced clear, protective top film encompasses substantially non-porous thermoplastic polymeric films having a softening point above about 100° C., more particularly, films of polymers of methyl methacrylate, methyl 2-fluoroacrylate, vinyl fluoride, ethylene glycol diisophthalate, ethylene glycol tereisophthalate, diallyl phthalate, diallyl isophthalate, acrylonitrileisobutylene, and the like. Films of these polymers are applied over the impregnated acrylic fiber print sheet either as such or by coating said print sheet, on the side opposite that which will be in contact with the base member, with a solution of the polymer in an inert organic solvent and then evaporating the solvent, again taking care not to substantially advance the cure of the resinous impregnant of the print sheet while driving off the solvent.

Drying of the print sheet member and partial advancement of its thermosetting resinous impregnant can also be accomplished after said sheet has been coated on one side with the coating which ultimately results in a clear, protective top film rather than before the application of said coating, using drying conditions as described hereinabove, whether said coating is thermoplastic or thermosetting in nature.

For the sake of brevity, films of polymers of methyl methacrylate will be taken as being exemplary of this class of materials. The techniques used in fabricating a substantially non-porous film of a polymer of methyl methacrylate, e.g., flat extrusion, blown tubular extrusion, casting, and the like, are so well known in the art that it is not deemed necessary to describe them here at any great length. A detailed treatment of such techniques may be found in the "Plastics Engineering Handbook of the Society of the Plastic Industry, Inc." (New York, Reinhold Publishing Corporation; 3rd edition, 1960), at pages 81–90 and 198 to 205.

The methyl methacrylate polymer employed is preferably a homopolymer of methyl methacrylate. However, copolymers of methyl methacrylate with up to about 30% by weight, and preferably from about 5% to about 20% by weight, based on the total weight of the copolymer, of one or more ethylenically unsaturated monomers copolymerizable therewith can also be employed, particularly where it is desired to modify the physical properties of the polymeric film, e.g., to impart even greater heat-resistance or solvent resistance thereto. A plurality of such comonomers are known in the prior art, included among which are methacrylic acid esters, e.g., ethyl methacrylate, propyl methacrylate, butyl methacrylate, and the like, acrylonitrile, methacrylonitrile, acrylamide, and the like. In addition, alkyl acrylates, e.g., methyl acrylate, ethyl acrylate, butyl acrylate, and the like may be employed as comonomers to impart a beneficial degree of internal plasticization to the methyl methacrylate polymer.

Whether a homopolymer or a copolymer of methyl methacrylate is used to prepare the polymeric film, its molecular weight will range from about 60,000 to about 250,000, and preferably from about 80,000 to about 150,000, as determined by intrinsic viscosity measurements, inasmuch as films prepared from polymers having molecular weights substantially lower than 60,000 will generally be deficient in one or more necessary physical properties, e.g., heat- or solvent-resistance, while films prepared from polymers having molecular weights substantially greater than 250,000 can generally be incorporated into the laminate structure only by using temperatures and pressures which would be harmful to the remainder of said structure.

Parenthetically, it should be noted that polymers of methyl methacrylate having molecular weights substantially greater than 250,000 can be used if they are applied from solution rather than as pre-formed films.

Besides internal plasticizers such as the alkyl acrylates, other well known plasticizers, such as dibutyl phthalate, dioctyl phthalate, low molecular weight polyethylene glycols, and the like, or lubricants, such as stearyl alcohol and the like, may be incorporated into the methyl methacrylate polymer. The amount of plasticizer or lubricant employed may range up to about 10% by weight, based on the total weight of the plasticized or lubricated polymer.

Substantially non-porous films of a polymer of methyl methacrylate (or any of the other thermoplastic polymers mentioned above) which range in thickness from about 2 mils to about 15 mils, and preferably from about 4 mils to about 8 mils, will be employed in practicing the present invention. In the case of a pre-formed film, it is not necessary that said film be entirely free of minor flaws such as bubbles, extrusion marks, and the like, inasmuch as such flaws will be pressed out of the film during the laminating operation. If desired, the preformed polymeric film may be biaxially or multiaxially stretched (stress-oriented) in the manner known in the prior art before being assembled with the remaining members of the laminating assembly to further improve certain of said film's physical properties, e.g., to further improve its craze-resistance and solvent-resistance.

Where it is desired to reinforce either of the two types of clear, protective top film just described in order to impart even greater durability to the decorative surface of the resulting laminate, an acrylic fiber sheet of the type employed as the print sheet, preferably one which is undecorated and has a refractive index matching that of the thermoplastic resin or thermoset resinous composition integral therewith, will be used as the reinforcement. Where such an acrylic fiber reinforcing sheet is used together with one of the aforementioned thermosetting resinous compositions, it can be impregnated or coated either from solution in an inert organic solvent or from an aqueous emulsion or dispersion, while if one of the aforementioned thermoplastic film-forming polymers is used, it will be applied to the acrylic fiber reinforcing sheet from solution in an inert organic solvent.

When a thermosetting resinous composition is used together with the acrylic fiber reinforcing sheet, said sheet will be impregnated or coated with from about 50% to about 90% by weight, and preferably from about 60% to about 70% by weight, based on the total dry weight of the impregnated sheet, of said composition. Where a thermoplastic film-forming polymer is used, the sheet will be impregnated or coated therewith to the extent necessary to provide a substantially non-porous film of from about 0.5 mil to about 7 mils, and preferably from about 2 mils to about 4 mils, in thickness.

Whether the acrylic fiber reinforcing sheet is impregnated or coated with a thermosetting resinous composition or a thermoplastic film-forming copolymer, it can be dried and, where a thermosetting composition is used, said composition can be partially advanced in cure, using drying conditions as described hereinabove for the print sheet. In addition, the reinforcing sheet and print sheet can be dried together as well as separately. Conventional laminating techniques are employed in preparing laminates from the above-described base members, print sheets and clear, protective top films. Thus, the members making up the laminating assembly, i.e., a thermoplastic clear, protective top film and an acrylic fiber print sheet impregnated with the curable resinous composition, or an impregnated print sheet coated on one side with either a thermosetting or a thermoplastic clear, protective top film, or a reinforced thermosetting or thermoplastic top film overlaying an impregnated print sheet, are then assembled, together with the base member, or with the individual sheets which, when consolidated by means of heat and pressure, will constitute all or part of the base member, and then inserted in a laminating press between laminating press plates, e.g., stainless steel press plates which may have finishes ranging from a mirror polish to a matt surface, either as a single assembly or as a multiple assembly of two or more of such single assemblies, and consolidated by means of heat and pressure into a unitary decorative structure. Besides laminates having only one decorative surface, balanced laminates wherein a mirror-image assembly of the decorative members is bonded to each side of a base or core member may also be prepared.

Temperatures ranging from about 135° C. to about 160° C., preferably from about 140° C. to about 150° C., and pressures ranging from about 150 p.s.i. to about 1500 p.s.i. will be employed. The particular pressure employed depends in large measure upon the nature of the base member and clear, protective top film employed. For example, where a conventional "low pressure" substrate, e.g., flakeboard, plywood, and the like, is used, pressures ranging from about 150 to about 350 p.s.i., and preferably from about 250 to about 300 p.s.i., will be used. Conversely, when a conventional "high pressure" substrate, e.g., a plurality of sheets of phenolic resin-impregnated paper and the like, is used, pressures ranging from about 600 to about 1500 p.s.i., and preferably from about 1100 to about 1200 p.s.i., will generally be employed. Similarly, where an acrylic fiber sheet is used to reinforce the clear, protective top film, pressures ranging from about 150 to about 600 p.s.i., and preferably from about 200 to about 300 p.s.i., will be used. The time required to effect substantially complete cure of the resinous components of the assembly when employing temperatures and pressures within the above-stated ranges will usually be from about 15 minutes to about 45 minutes. The resulting laminate is generally allowed to cool to a temperature of less than about 50° C., and preferably to room temperature, before being removed from the press.

In order that those skilled in the art may more fully understand the inventive concept presented herein, the following examples are set forth. These examples are given solely by way of illustration, and should not be considered as expressing limitations unless so set forth in the appended claims. All parts and percentages are by weight, unless otherwise stated.

EXAMPLE I

This example illustrates the preparation of typical monomer mixtures useful in the preparation of the acrylic resin impregnating and coating agents employed in Examples II to XIII.

*Preparation of dispersion A*

[90/10 methyl methacrylate/methacrylic acid]

A solution containing 6 parts of dioctyl sodium sulfosuccinate, 11.4 parts of Triton X-305 (a 70% active solution of an octylphenol-ethylene oxide condensate) and 0.8 part of sodium bicarbonate dissolved in 1100 parts of water was charged to a suitable reaction vessel equipped with thermometer, stirrer, reflux condenser, inert gas inlet tube and addition funnel. After flushing the solution with nitrogen gas for 30 minutes (a stream of nitrogen gas was employed to maintain an inert atmosphere throughout the reaction) and then heating it to 60° C. with stirring (stirring being maintained throughout the preparation), a solution of 1 part of ammonium persulfate in 100 parts of water was added. Five minutes later, after heating the resulting solution to 75° C., 164 parts of a monomer-emulsifier mixture containing 720 parts of methyl methacrylate, 80 parts of methacrylic acid and 17.2 parts of Triton X-305 were added. At this point, the temperature of the resulting emulsified reaction mixture rose exothermically to 85° C. When the temperature began to drop, the remainder of the monomer-emulsifier mixture was added dropwise to the emulsion over a period of about one hour, during which time the temperature was maintained at between 77°C. and 82° C. After the last addition of the monomer-emulsifier mixture, the emulsion was maintained at between about 75° C. and 80° C. for 30 minutes and then allowed to cool to room temperature. During cooling, the reflux condenser and thermometer were removed and a rapid stream of nitrogen gas was passed through the reaction vessel to remove any unreacted monomers. Finally, the pH was adjusted to 8.2 with concentrated ammonia and the product was then filtered through cheesecloth, giving an aqueous polymer dispersion having a solids content of 45.7%.

*Preparation of dispersions B–L*

In a manner similar to that set forth for the preparation of Dispersion A, the aqueous dispersions described in Table I below in terms of their polymeric components, pH's and solids concentrations were prepared.

TABLE I

| Dispersion | Polymeric Component [1] | pH | Percent Solids Concentration |
|---|---|---|---|
| B | 60/30/10—MMA/EA/MAA | 7.6 | 41 |
| C | 60/35/5—MMA/EA/MAA | 7.1 | 41.7 |
| D | 45/25/20/10—MMA/EA/AN/MAA | 7.5 | 39 |
| E | 50/25/20/5—MMA/EA/AN/MAA | 7.6 | 42 |
| F | 85/15—BMA/MAA | 7.5 | 35 |
| G | 60/25/15—MMA/BMA/MAA | 7.0 | 35 |
| H | 75/15/10—MMA/EHA/MAA | 7.8 | 41 |
| I | 50/45/5—MMA/EA/β—HEMA | 8.3 | 48 |
| J | 52.5/42.5/5—MMA/EA/MA | 9.5 | 45 |
| K | 60/35/5—MMA/EA/AA | 7.1 | 42 |
| L | 60/35/5—S/EA/MAA | 8.1 | 40 |

[1] Monomers are expressed in parts, e.g., Dispersion B contains a copolymer of 60 parts of methyl methacrylate, 30 parts of ethyl acrylate and 10 parts of methacrylic acid.
MMA=methyl methacrylate; BMA=butyl methacrylate; S=styrene; EA=ethyl acrylate; EHA=2-ethylhexyl acrylate; AN=acrylonitrile; MAA=methacrylic acid; β-HEMA=β-hydroxyethyl methacrylate; MA=methacrylamide; AA=acrylamide.

EXAMPLE II

A quantity of Dispersion A was admixed with sufficient acetone to coagulate and precipitate the methyl methacrylate/methacrylic acid copolymer. The coagulum was then poured into a shallow container and dried at 80° C. until substantially all of the acetone and water had evaporated. Next, the copolymer solids were dissolved in acetone to give a 30% solution, and to this solution there was then added and dissolved an amount of 3,4-epoxy-6-methylcyclohexylmethyl 3,4-epoxy-6-methyl-cyclohexanecarboxylate sufficient to result in a weight ratio of copolymer solids:diepoxide of 100:30, respectively.

A 35.5 lb. basis weight grade water-laid acrylic fiber print sheet (hereinafter called "Paper X"), about 6 mils thick, made up of fibrillated wet-spun filaments of a copolymer of 90 parts of acrylonitrile and 10 parts of methyl methacrylate, was dipped in the acetone solution of the copolymer and diepoxide to give an impregnated print sheet having a resin pickup of the curable resinous composition (reactive copolymer and diepoxide) of 50 to 60%, based on the total dry weight of the impregnated sheet. Next, the impregnated print sheet was air-dried at room temperature to allow the acetone to evaporate therefrom.

The dried, impregnated acrylic fiber print sheet was incorporated in a laminating assembly consisting of (from the bottom up) 3 sheets of standard thermosetting phenolic resin-impregnated creped kraft paper, 4 sheets of standard thermosetting phenolic resin-impregnated uncreped kraft paper, the print sheet, and a substantially non-porous sheet of polymethyl methacrylate, 5 mils thick, flat extruded from Diakon LO polymethyl methacrylate (average molecular weight approximately 100,000). The entire assembly was then positioned between a pair of stainless steel press plates having a mirror polish finish and laminated at a temperature of 140° C. under a pressure of 1100 p.s.i. for 15 minutes. The resulting laminate, after being allowed to cool to room temperature, was removed from the press. It had a smooth, glossy decorative surface.

EXAMPLES III TO XIII

In these examples, "Paper X" is the fibrillated acrylic print sheet paper and "diepoxide" is the curing agent, each as described in Example II.

EXAMPLE III

A sheet of Paper X was treated with the following emulsion-polymerized thermosetting acrylic resin: MMA/EA/MAA/diepoxide having monomer ratios in parts by weight of 80/10/10/30. The resin was prepared from an acetone solution to obtain a 50–60% resin pickup. The solvent was allowed to evaporate at room temperature. The resin impregnated sheet was then laminated to a sheet of flake board base member for 30 minutes at 160° C. and 300 p.s.i. A hard transparent surface was formed over the flake board.

EXAMPLE IV

Same as Example III except that a white pigmented sheet of Paper X was used. The pigment was $TiO_2$ at a concentration of 25%. A hard white surface was formed on the flake board.

EXAMPLE V

Same as Example IV except that a sheet of extruded methyl methacrylate having a thickness of 5 mils was laminated over the impregnated Paper X.

EXAMPLE VI

Two sheets of Paper X, one pigmented and the other unpigmented, were treated with the following thermosetting acrylic resin: MMA/EA/MAA/diepoxide in the monomer ratio of parts by weight of 80/10/10/30. The resin was prepared from an acetone solution to obtain a 50–60% resin pickup. The solvent was allowed to evaporate at room temperature as in Example III. The unpigmented sheet was placed over the pigmented sheet and then laminated onto a sheet of flake board for 30 minutes at 160° C. and 300 p.s.i.

EXAMPLE VII

Same as Example V except that a sheet of polyvinyl fluoride film 2 mils thick was used instead of the methyl methacrylate film.

EXAMPLE VIII

Same as Example V except that a sheet of acrylonitrile/isobutylene film prepared in a 80/20 parts by weight monomer ratio and 2 mils thick was used instead of the methyl methacrylate film.

EXAMPLE IX

A sheet of white pigmented Paper X was treated with the following thermosetting acrylic resin: MMA/EA/MAA/diepoxide: 80/10/10/30 from an acetone solution to obtain a 50–60% resin pickup. The solvent was allowed to evaporate at room temperature. The top side of the treated Paper X was then coated with an emulsion of the same thermosetting acrylic resin to build up a layer about 4 mils thick. The treated Paper X sheet was then dried in an oven for 15 minutes at 80° C., and laminated, emulsion coated side up, onto a sheet of flake board for 30 minutes at 160° C. and 300 p.s.i.

EXAMPLE X

Same as Example IV, except that treated cement asbestos board was used instead of flake board as the substrate and lamination pressure was 1100 p.s.i. instead of 300 p.s.i. The treatment of the cement asbestos board consisted of coating the surface of the board with a 30% solution of an epoxy/polyamine resin such as a bisphenol-A/epichlorohydrin reaction product cured with m-phenylene diamine and curing the surface for 30 minutes at 150° C.

EXAMPLE XI

Two sheets of Paper X, one a print sheet and the other an overlay sheet, were treated with the following thermosetting acrylic resin: MMA/EA/MAA/diepoxide, having monomer ratios in parts by weight of 80/10/10/30. The resin was prepared from an acetone solution to obtain a 50–60% resin pickup. The solvent was allowed to evaporate at room temperature. The overlay sheet was placed over the print sheet and then laminated onto a sheet of cement asbestos board (coated as in Example X) 160° C. and 100 p.s.i. A hard-surfaced decorative laminate resulted.

EXAMPLE XII

A sheet of Paper X was treated with an emulsion of a thermosetting acrylic resin, MMA/EA/AN/MAA; having a monomer ratio in parts by weight of 50/25/20/5, and 3.75% hexakis(methoxymethyl)melamine (about 40% solids). The paper was dipped in the emulsion and dried for 10 minutes at 70° C. until a resin pickup of 77–81% was obtained. A series of laminates were then prepared using the above impregnated paper:

(a) A standard paper laminate was prepared employing a phenolic impregnated kraft paper base member, but the melamine overlay sheet was replaced by the above impregnated Paper X sheet. Lamination conditions were 30 minutes at 148° C. and 1100 p.s.i. A good laminate resulted.

(b) A sheet of the above treated Paper X was laminated with good results onto plywood; lamination conditions were 30 minutes at 150° C. and 200 p.s.i.

(c) A sheet of the above treated Paper X was laminated with good results onto flake board. Lamination conditions were 30 minutes at 150° C. and 200 p.s.i.

EXAMPLE XIII

A sheet of Paper X containing 3% pigment was treated with the following solution: polymerized thermosetting acrylic resin MMA/EA/MAA having a monomeric ratio of 80/10/10 in parts by weight in admixture with 20% hexakis(methoxymethyl)melamine. A resin pickup of 42% was obtained and the acetone solvent was allowed to evaporate at room temperature. The treated sheet was then laminated onto a sheet of cement asbestos board which had been treated with an epoxy-amine resin (such as that described in Example X above) for 30 minutes at 150° C. and 300 p.s.i. A good laminate resulted.

I claim:

1. A unitary heat- and pressure-consolidated laminated article which comprises
   (I) a rigidity-imparting base member,
   (II) a print sheet member directly bonded to said base member comprising a sheet of fibrillated wet-spun filaments of a polymer of acrylonitrile impregnated from organic solution with from about 35 to 65% by weight based on the dry weight of the impregnated sheet, of a substantially completely cured resinous composition which, in its uncured state, is a curable resinous composition comprising components (A) and (B), wherein said (A) is a reactive water-dispersible essentially linear copolymer having a molecular weight of from about 10,000 to 1,000,000 of (a) from about 50% to 98% by weight of a monoethylenically unsaturated hardening comonomer containing no functional groups reactive with component (B), (b) from about 2% to 50% by weight of a monoethylenically unsaturated comonomer containing at least one functional group reactive with component (B), the weights of said (a) and (b) being based on the total weight of monomers in said copolymer and wherein said component (B) is a cross-linking amount of a member selected from the group consisting of the alkyl ethers of polymethylolated melamines having from about 5 to 6 alkoxymethyl groups, said alkoxymethyl groups containing 2 to 4 carbon atoms, inclusive, and a 3,4-epoxycyclohexylmethyl 3,4-epoxycyclohexanecarboxylate, the weight ratio of said (A) to said (B) being from about 1:1 to about 4:1, respectively, and
   (III) a substantially clear protective top layer from about 0.5 to 7 mils in thickness, directly bonded to print sheet (II), comprising a member selected from the group consisting of
      (a) a substantially completely cured resinous composition which, in its uncured state, is a curable resinous composition comprising said (A) and (B) in the ratio of about 1:1 to about 4:1, wherein said (A) has a molecular weight of about 10,000 to 1,000,000,
      (b) a substantially non-porous thermoplastic polymeric film having a softening point above about 100° C., and
      (c) a reinforcing sheet of fibrillated wet-spun filaments of a polymer of acrylonitrile impregnated with a resinous composition selected from the group consisting of (IIIa) and (IIIb).

2. The laminated article of claim 1 wherein component (A) is a copolymer of (a) about 90% by weight of methyl methacrylate and (b) about 10% by weight of methacrylic acid.

3. The laminated article of claim 2 wherein component (B) is 3,4 - epoxy - 6 - methylcyclohexylmethyl-3,4-epoxy-6-methylcyclohexanecarboxylate.

4. The laminated article of claim 1 wherein component (A) is a terpolymer of from about 50 to 93% by weight of (a), from about 2 to 50% by weight of (b), and from about 5 to 45% by weight of (c), a monoethylenically unsaturated softening comonomer containing functional groups reactive with component (B), the weights of (a), (b) and (c) being based on the total weight of monomers in said terpolymer.

5. The laminated article of claim 2 wherein component (B) is an alkyl ether of polymethylolated melamine having from about 5 to 6 alkoxymethyl groups, said groups containing from about 2 to 4 carbon atoms.

6. A unitary, heat- and pressure-consolidated article which comprises
   (I) a rigidity-imparting base member,
   (II) a print sheet member, directly bonded to said base member, comprising a sheet of fibrillated wet-spun filaments of a polymer of acrylonitrile impregnated from organic solution with from about 35 to 65% by weight, based on the dry weight of the coated sheet, to form a protective coating of from about 0.5 to 7 mils in thickness, of a substantially completely cured resinous composition which, in its uncured state, is a curable resinous composition comprising a blend of
      (A) 100 parts by weight of an essentially linear terpolymer of methyl methacrylate, ethyl methacrylate, and methacrylic acid in the ratio of about 80:10:10 parts by weight, said terpolymer having a molecular weight of from about 25,000 to 1,000,000, and
      (B) 30 parts by weight of 3,4-epoxy-6-methylcyclohexylmethyl-3,4-epoxy-6 - methylcyclohexanecarboxylate.

7. The article of claim 6 having, as an additional protective overlay film, such that the total thickness of the print sheet coating and overlay film is from about 0.5 to 7 mils, a polymeric material having a molecular weight of from about 60,000 to 250,000, selected from the group consisting of substantially non-porous films of
   (1) polymethylmethacrylate,
   (2) copolymers of methylmethacrylate and monoethylenically unsaturated monomers copolymerizable therewith,

17

(3) polyvinyl fluoride, and
(4) a copolymer of acrylonitrile and isobutylene.

8. The article of claim 6 having, as an additional reinforcing top layer, a sheet of fibrillated wet-spun filaments of a polymer of acrylonitrile impregnated with a polymeric material selected from the group consisting of
  (a) a substantially non-porous thermoplastic polymeric film having a softening point above about 100° C. selected from the group consisting of
    (1) polymethylmethacrylate,
    (2) copolymers of methylmethacrylate and monoethylenically unsaturated monomers copolymerizable therewith,
    (3) polyvinyl fluoride, and
    (4) a copolymer of acrylonitrile and isobutylene, and
  (b) from about 50% to about 90% by weight, based on the total dry weight of said impregnated sheet, of the resinous composition of (II).

9. A unitary, heat- and pressure-consolidated laminated articles which comprises
  (I) a rigidity-imparting base member,
  (II) a print sheet member, directly bonded to said base member, comprising a sheet of fibrillated wet-spun filaments of a polymer of acrylonitrile impregnated from an emulsion with from about 77% to 81% by weight, based on the dry weight of the impregnated print sheet, to form a protective coating of from about 0.5 to 7 mils in thickness, of a substantially completely cured resinous composition which, in its uncured state, is a thermo-setting blend of methylmethacrylate, ethyl acrylate, acrylonitrile and methacrylic acid in ratio of parts by weight of about 50:25:20:5 respectively, and as the curing agent therefore, about 3.75% by weight of hexakis(methoxymethyl)melamine.

10. A print sheet, suitable for use in a unitary heat- and pressure-consolidated laminated article, comprising a sheet of fibrillated wet-spun filaments of a polymer of acrylonitrile impregnated from organic solution with from about 35 to 65% by weight, based on the dry weight of the impregnated sheet to form a protective coating of from about 0.5 to 7 mils in thickness, of a substantially completely cured resinous composition which, in its uncured state, is a curable resinous composition comprising components (A) and (B), wherein said (A) is a reactive water-dispersible essentially linear copolymer having a molecular weight of from about 10,000 to 1,000,000, of

18

(a) from about 50% to 98% by weight of a monoethylenically unsaturated hardening comonomer containing no functional groups reactive with component (B), (b) from about 2% to 50% by weight of a monoethylenically unsaturated comonomer containing at least one functional group reactive with component (B), the weights of said (a) and (b) being based on the total weight of monomers in said copolymer and wherein said component (B) is a cross-linking amount of a member selected from the group consisting of the alkyl ethers of polymethylolated melamines having from about 5 to 6 alkoxymethyl groups, said alkoxymethyl groups containing 2 to 4 carbon atoms, inclusive, and a 3,4-epoxycyclohexylmethyl-3,4-epoxycyclohexanecarboxylate, the weight ratio of said (A) to said (B) being from about 1:1 to about 4:1, respectively.

11. The print sheet member of claim 10, wherein component (A) is a copyolymer of (a) about 90% by weight of methylmethacrylate and (b) about 10% by weight of methacrylic acid.

12. The print sheet member of claim 11, wherein component (B) is 3,4-epoxy-6-methylcyclohexylmethyl-3,4-epoxy-6-methylcyclohexanecarboxylate.

13. The print sheet member of claim 10, wherein component (A) is a terpolymer of from about 50 to 98% by weight of (a), from about 2 to 50% by weight of (b), and from about 5 to 45% by weight of (c), a monoethylenically unsaturated softening comonomer containing functional groups reactive with component (B), the weights of (a), (b) and (c) being based on the total weight of monomers in said terpolymer.

14. The print sheet member of claim 11, wherein component (B) is an alkyl ether of a polymethylolated melamine having about 5 to 6 alkoxymethyl groups, said groups containing from about 2 to 4 carbon atoms.

References Cited by the Examiner

UNITED STATES PATENTS

| | | | |
|---|---|---|---|
| 2,604,457 | 7/1952 | Segall et al. | 260–836 |
| 2,784,135 | 3/1957 | Wooding et al. | 161–251 XR |
| 2,794,010 | 5/1957 | Jackson | 260–836 |
| 2,890,209 | 6/1959 | Phillip et al. | 260–78.3 |
| 2,906,724 | 9/1959 | Daniel | 260–856 |
| 2,930,727 | 3/1960 | Baranyi | 161–263 X |
| 3,021,239 | 2/1962 | Lindenfelser et al. | 161–231 XR |

ALEXANDER WYMAN, *Primary Examiner.*

MORRIS SUSSMAN, *Examiner.*